April 19, 1932.                F. C. PARKER                    1,854,665
                              FOCUSING DEVICE
                            Filed Nov. 1, 1930         2 Sheets-Sheet 1
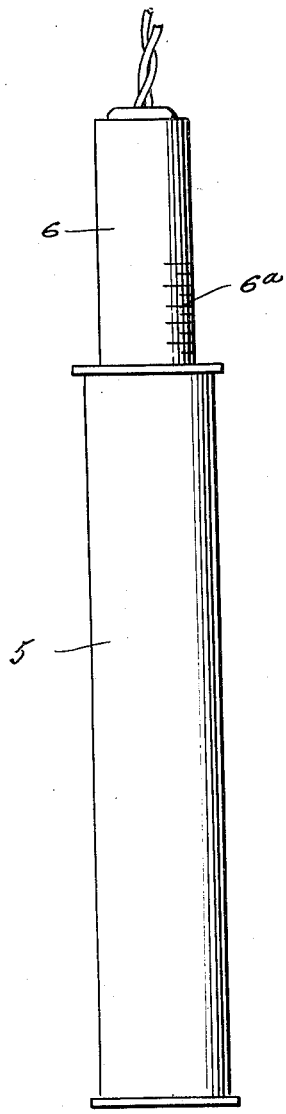
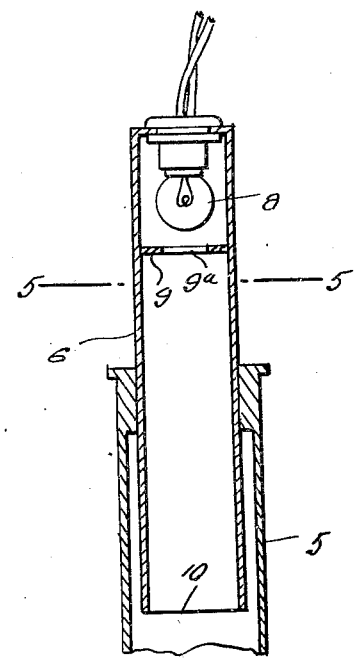
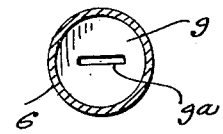
Inventor
F. C. Parker
By Clarence A. O'Brien
Attorney April 19, 1932.   F. C. PARKER   1,854,665
FOCUSING DEVICE
Filed Nov. 1, 1930   2 Sheets-Sheet 2
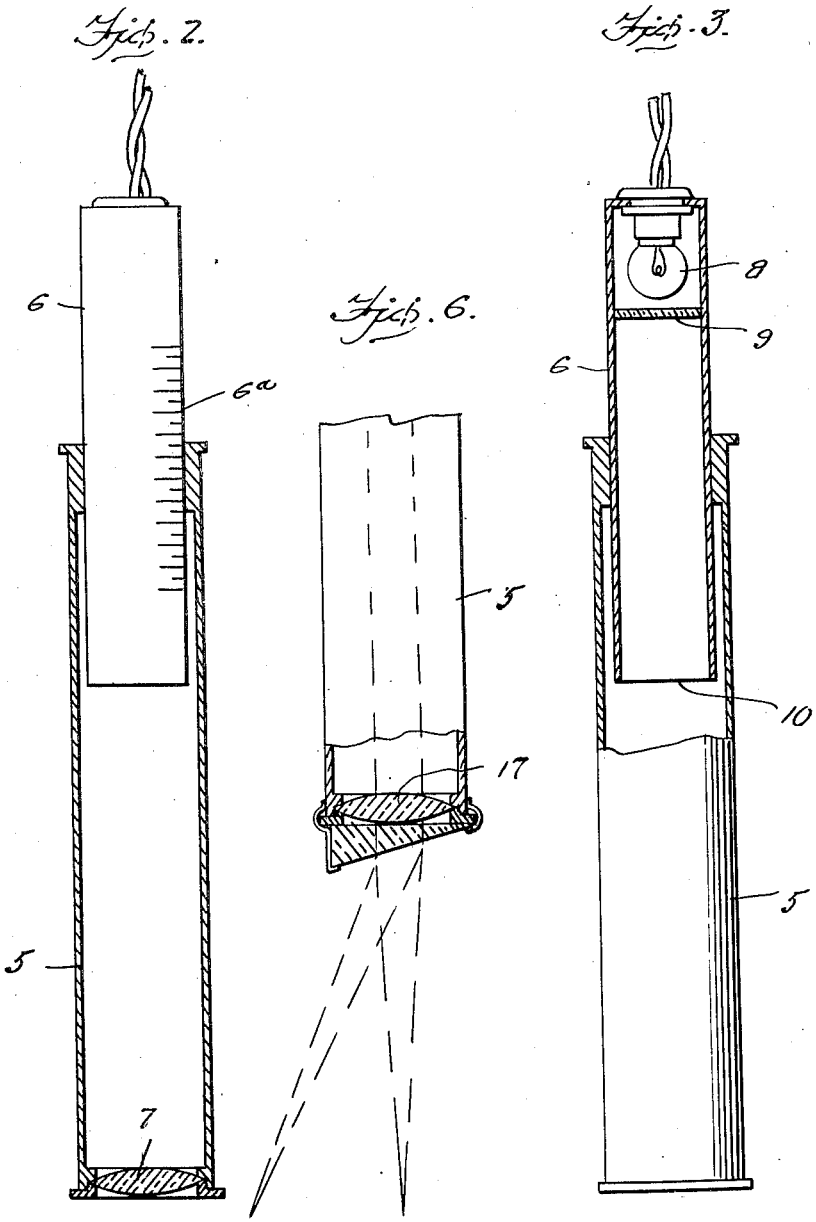
Inventor
F. C. Parker
By Clarence A. O'Brien
Attorney Patented Apr. 19, 1932

1,854,665

UNITED STATES PATENT OFFICE

FRANK CLAVELOUX PARKER, OF NORRISTOWN, PENNSYLVANIA

FOCUSING DEVICE

Application filed November 1, 1930. Serial No. 492,811.

This invention relates to optical focusing devices wherein a projected beam of light of predetermined character is used to indicate the proper placement of an optical machine requiring focusing with respect to its object. The invention particularly provides means whereby the certain and expeditious focusing of a camera or the like may be achieved without the use of "finders", particularly in work where an object is to be photographed in or viewed in minute detail or where the camera or the like is in a position making it difficult and inconvenient to employ a "finder"; and to provide focusing means for cameras and the like which are not equipped with focusing devices, and for such devices where their focusing equipment would be inadequate in close up work.

The invention is carried out and the objects thereof achieved through the provision of a structure which may be in the form of an attachment for or to be incorporated in a camera or the like embodying a casing having a slidable interiorly illuminated member adapted to slide in calibrated relation with the casing to vary the projection of a beam of light to produce a spot of light on an image of a predetermined character upon the object to be viewed or photographed to enable the camera or the like to which it is attached or on which it is incorporated, to be brought into focus with the object, which focus will correspond with the calibrated position of the sliding member at the instant the beam of light produces upon the object the image or spot of light of predetermined character.

Thus a means is provided whereby when the spot of light is in focus the camera or the like will also be in focus. When moving the camera or the like it is only necessary to watch the spot of light upon the object to know instantly whether or not said camera or the like is being maintained in focus which knowledge is of great importance and convenience in connection with devices requiring accurate focusing and orientating in their use.

In addition to its normal focusing function, the device may be thrown out of focus and made to cover a predetermined area which would correspond with the field covered by the camera or the like, thus permitting visual determination of said field.

These and other objects, the nature of the invention and the combination and composition of its parts, will be understood by anyone familiar with the art to which this invention relates by upon reading the following explanation of the drawings hereto attached in which:—

Figure 1 is a side view of one embodiment of the invention.

Figure 2 is a side view of the same partially in section.

Figure 3 is a sectional side view.

Figure 4 is a detail of the slidable member.

Figure 5 is an upward cross section on 5—5 of Figure 4.

Figure 6 is a detail of the lower part of the casing and showing an attachment therefor.

These drawings and the following description thereof are not intended to limit the application of this invention, but any changes in construction, composition and arrangement of parts consistent with the scope of the invention may be resorted to.

Considering the drawings in detail, a casing 5 has a tubular slide 6 on its upper end and a lens 7 in its lower end. The tubular slide 6 has a source of illumination 8 on its upper end and a screen or diaphragm 9 intermediate the source of illumination and its lower end which is open as at 10. The outside of the slide 6 is calibrated as at 6a to correspond with the calibration of the lenses of a camera or the like in conjunction with which the device is to be used. The light from the source 8 is interrupted by the diaphragm 9 so as to impinge a characteristic beam on the lens 7 on the lower end of the casing 5. The diaphragm 9 may be opaque and provided with a small hole, a slit, cross, or other formation as at 11 to define an image or spot of light and the light source 8 may be colored if desired to project a colored image, or the diaphragm may be provided of transparent or translucent material or of selected color transmitting properties. The color transmitting features may be dispensed with or it may be provided by said diaphragm or by the light source, or it may be provided by employing a colored lens 7 in the bottom of the casing to project the colored image. A prism designated by the numeral 8 in Figure 6 may be attached to the lower end of the casing 5 to cooperate with the lens 7 to project the beam of light laterally or vertically to the degree required to compensate for the placement of the device in a position out of coincidence with the axis or centre of the lenses of the camera or the like.

It will now be obvious that I have provided a device of the character described which is simple and inexpensive in construction, convenient and easy to use, highly efficient and adaptable, and otherwise admirably suited to accomplish in a new and improved manner the purpose for which it is designed. The device is operated simply by setting the calibrated slide tube at the desired focus and moving the camera or the like on which it is mounted until the device forms a sharp image upon the object to be photographed or the like. When the sharp image is achieved the camera or the like will be in like sharp focus. The placement of the light source of the device of this invention may be changed to one exterior to the casing without departure.

Having described my invention, I claim:—

1. A device of the character described, a focusing device for a camera or the like comprising a casing, a projecting lens in one end of the casing, and a sliding calibrated tube in the other, a light source at the outer end of said tube, a light modifying means intermediate said light source and the inner end of the tube to limit the character of a beam of light proceeding from said light source and impinging upon the lens in the end of the casing, said sliding tube being adapted to be adjusted so that said lens will project a perfect image on an object to be photographed or viewed at the same distance as a predetermined adjustment of the lenses of a camera or the like would require, to facilitate placement of the camera or the like with respect to the object to be photographed or viewed.

2. A camera focusing device of the character described, comprising an adjustable means for projecting a visible optical image of a predetermined focus on an object to be photographed, means associated with said projecting means to calibrate the focus of said image, said calibrations corresponding with the calibrations of the lenses of the camera, to enable the focus of the camera to be adjusted to correspond with the focus of the said projected image.

3. A focusing device of the character described comprising a casing adapted to be connected to a camera or other optical device, a projecting lens in one end of the casing, and a sliding tube in the other end of the casing having calibrations thereon readable in connection with the adjacent end of the casing, said calibrations being corresponded to the calibrations of the focus adjusting means of the camera or other optical device, a source of illumination in the outer end of the sliding tube and an image producing screen between the source of illumination and the screen for adjustably impinging an image of the screen on the projection lens, whereby to project a sharp image on an object to be photographed or viewed when the camera or other optical device is moved into its proper distance and relation with the said object.

In testimony whereof I affix my signature.

FRANK CLAVELOUX PARKER.